Aug. 27, 1940.  H. W. PRICE ET AL  2,212,954

CLUTCH CONTROL MECHANISM

Original Filed May 31, 1935  2 Sheets-Sheet 1

INVENTOR
HAROLD W. PRICE
EARL R. PRICE
BY
ATTORNEY

INVENTOR
HAROLD W. PRICE
EARL R. PRICE
BY
ATTORNEY

Patented Aug. 27, 1940

2,212,954

UNITED STATES PATENT OFFICE 2,212,954

CLUTCH CONTROL MECHANISM

Harold W. Price and Earl R. Price, South Bend, Ind., assignors to Bendix Products Corporation, South Bend, Ind., a corporation of Indiana Original application May 31, 1935, Serial No. 24,305. Divided and this application February 28, 1938, Serial No. 192,949

1 Claim. (Cl. 192—.01)

This invention relates in general to clutch operators, and more particularly to power means for operating the clutch of an automotive vehicle.

The principal object of the invention is to provide a pressure differential operated motor for disengaging the clutch and subsequently controlling the engagement thereof in accordance with the speed of the vehicle. To this end the clutch is operated by a motor, preferably of the double-ended type, both the time of operation and the mode of operation of its clutch connected power element being controlled by the gaseous pressure within the motor. The pressure in turn is preferably controlled by an accelerator operated three-way valve to initiate the clutch controlling operation of the motor and by a driven clutch plate operated valve for controlling the clutch engaging operation of the motor.

Yet another object of the invention is to provide centrifugally operated means for controlling the clutch engaging operation of the clutch motor, said means being operative in accordance with the speed of the driven clutch plate.

Other objects and desirable features of the invention will be apparent from the following specification, taken in conjunction with the drawings, in which.

Figure 1:
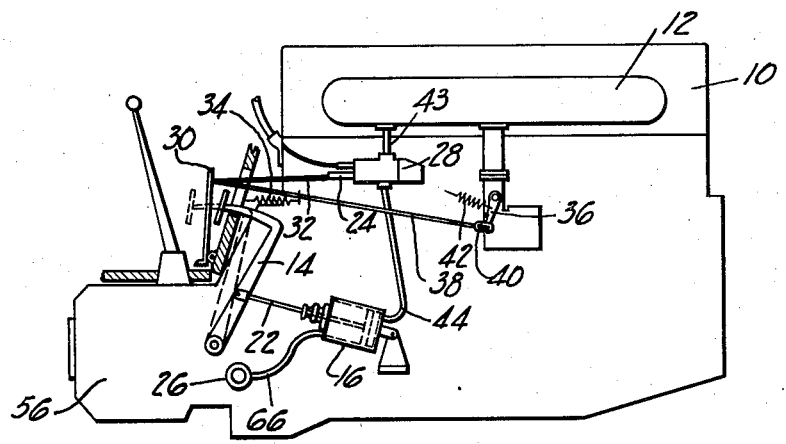
Figure 1 is a diagrammatic view of the essential features of a preferred embodiment of the invention.

There are disclosed in Figure 1 an internal-combustion engine 10 having an intake manifold 12 and a clutch operating lever 14 operatively connected to a conventional clutch having driving and driven plates, the latter interconnecting, in the usual manner, the engine and transmission.

The invention is directed to power means for so operating the clutch as to simulate a conventional manual operation thereof. To this end a pressure differential operated motor 16, comprising a cylinder 18 and a piston 20, is operably connected by a link 22 to the lever 14, the latter being operatively connected to a conventional clutch, not shown. The aforementioned lever, constituting a conventional manually operable clutch pedal, may be operated to control the clutch in the event that the power means for operating the same is for any reason rendered inoperative.

Figure 2:
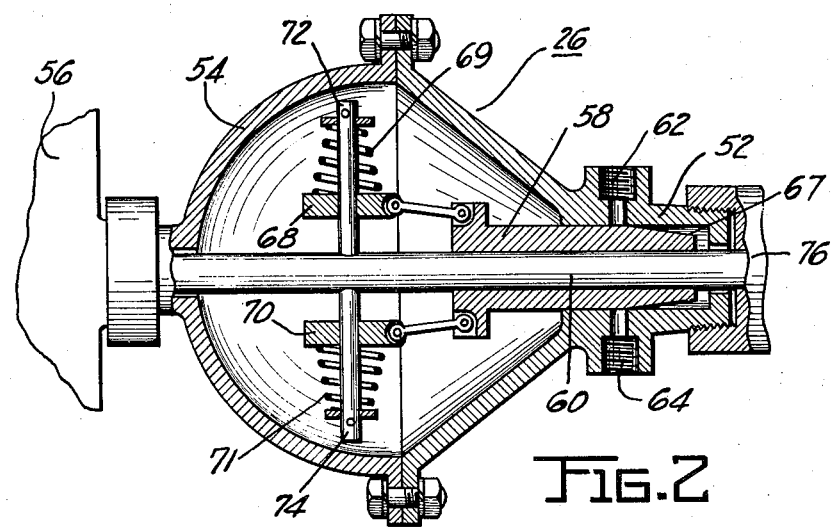
Figure 2 is a sectional view of the governor operated bleed valve of Figure 1, constituting the essence of my invention.
Figure 4:
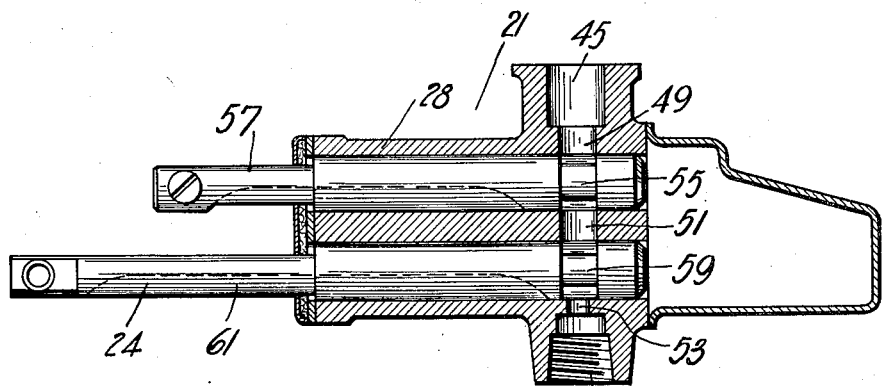
Figure 4 is a sectional view of the manually operated valve mechanism of Figure 1.

Both the time and mode of operation of the motor 16 in operating the clutch are determined by the gaseous pressure within the same, and such pressure is controlled by a three-way valve 24 and a bleed valve 26, disclosed in Figures 2 and 4. The three-way valve is housed within the lower portion of a valve unit 28, Figure 4, said valve being operable by an accelerator 30 through a connection 32. The accelerator, returned to its off position by a spring 34, also performs its usual function of operating a throttle lever 36 connected thereto by a link 38. The link 38 is provided with a slot at 40 to provide a lost motion connection, whereby the throttle is closed before the aforementioned three-way valve is opened to initiate a disengagement of the clutch and the valve is opened to initiate an engagement of the clutch prior to an opening of the throttle. The throttle is returned to its off position by a spring 42.

Figure 3:
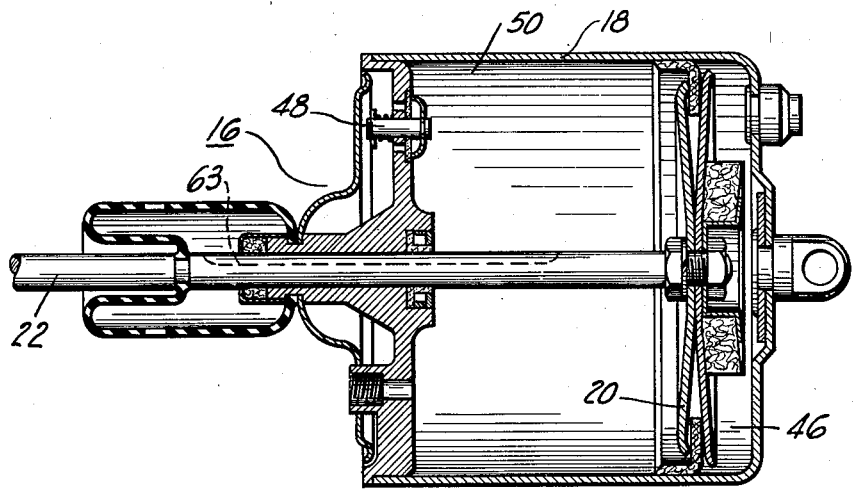
Figure 3 is a sectional view of the clutch operating pressure differential operated motor of Figure 1.

Upon release of the accelerator, the valve 24 is positioned to interconnect the intake manifold 12 with one end of the cylinder 18, such connection being made possible by conduits 43 and 44, ports 45 and 47 and ducts 49, 51 and 53 in valve unit 28, a small bodied portion 55 in a cut-out valve 57 and a small bodied portion 59 of the valve 24. The manifold at closed throttle is partially evacuated, resulting in the evacuation of a right end compartment 46, Figure 3, of the cylinder. This results in the piston 20 being drawn to the right, under the load of atmosphere admitted through a check valve 48. The clutch is thus automatically disengaged with release of the accelerator.

Upon depressing the accelerator, the three-way valve 24 is operated to vent the compartment 46 to the atmosphere via a slot 61 in the valve, the duct 53 and port 47. There is thus initiated a clutch engaging operation of the clutch motor. The mode of engagement of the clutch is determined by the gaseous pressure acting on the piston 20, the pressure within a left compartment 50 of the cylinder 18 being in part determined by a slot 63 in the connecting rod 22, said slot permitting a relatively rapid efflux of air from the compartment 50, resulting in a relatively rapid movement of the driven clutch plate as it moves toward the driving clutch plate. The length of the slot is such as to terminate this rapid movement of the driven clutch plate just when the same contacts the driving clutch plate. Thereafter, the rate of movement of the driven clutch plate is determined by the efflux of air from the compartment 50 via bleed valve 26 controlled by the driven clutch plate.

The bleed valve 26 preferably comprises a tubular end portion 52 of a hollow spherically-shaped two-part casing 54, fixedly secured to the variable speed transmission casing 56, and a reciprocable tubular member 58 sleeved over a rod 60 and within the bore of the aforementioned end portion 52. Said portion is ported at 62 and 64, port 62 being connected with the compartment 50 of the cylinder 18 by a conduit 66. The end of the reciprocable bleed valve member is tapered at 67 to progressively effect a greater flow of air through the conduit 66 and port 64, as the member 58 is drawn to the left. When the vehicle is at a standstill, the inner end of the tapered portion 67 registers with the port 62 sufficiently to permit a slight flow of air from the compartment 50. Such a construction permits a very slow clutch engaging operation of the motor to thus start the vehicle in motion. Thereafter, the bleed of air from the compartment 50 and the consequent rate of clutch engaging movement of the clutch pedal 14 are functions of the speed of the mechanism driving the rod 60. The member 58 is operated by governor means comprising discs 68 and 70 freely sleeved over pins 72 and 74 secured to the rod 60, the latter being driven either by the driven element of the clutch or by the propeller shaft and serving to drive a speedometer mechanism through the medium of a connection 76. As the speed of the rod 60 increases the discs 68 and 70 are moved outwardly against the tension of springs 69 and 71 respectively, to thereby draw the member 58 to the left, the degree of movement being directly proportional to the speed of the rod.

Release of the accelerator therefore effects a disengagement of the clutch and depression thereof initiates an engagement of the clutch, the rate of engagement being determined by the then existing speed of the vehicle.

The invention heretofore described is disclosed in our Patent No. 2,127,752, dated August 29, 1938, this application constituting a division thereof.

While one illustrative embodiment has been described, it is not our intention to limit the scope of the invention to that particular embodiment, or otherwise than by the terms of the appended claim.

We claim:

In an automotive vehicle provided with a clutch and a source of vacuum, power means for operating the clutch comprising a double-ended pressure differential operated motor, valve means for initiating the clutch disengaging and engaging operations of the motor by connecting the source of vacuum with one end of the motor to thereby effect a partial evacuation of the air from the motor, a reciprocable tapered bleed valve for controlling the clutch engaging operation of the motor by regulating the rate of efflux of air from the other end of the motor, and bleed valve operating means interconnecting said valve with the driven clutch plate, said means consisting of weight members operable by and in accordance with the speed of the driven clutch member, force transmitting means interconnecting said weight members with the bleed valve and force transmitting means interconnecting said weight members with the driven clutch plate, said bleed valve operating means constituting the sole means for interconnecting the driven clutch plate with the bleed valve.

HAROLD W. PRICE.
EARL R. PRICE.